Patented Oct. 3, 1939

2,174,856

UNITED STATES PATENT OFFICE 2,174,856

PROCESS OF PRODUCING SULPHONYL HALIDES

Treat B. Johnson, Bethany, Conn., assignor to Rohm & Haas Company, Philadelphia, Pa., a corporation of Delaware No Drawing. Application April 13, 1938, Serial No. 201,728

9 Claims. (Cl. 260—543)

This invention relates to an improved process for the production of sulphonyl halides. The process does not involve the use of dangerous materials such as phosphorus compounds, or the use of extremely unpleasant materials, such as mercaptans. It is economical and enables the ready production of sulphonyl halides, etc. from readily available materials.

The invention is advantageous for the production of alkyl, aralkyl, alicyclic, heterocyclic, aryl and, in general, all organic sulphonyl halides, sulphonic acids, sulphonamids or derivatives thereof, in which the sulphonyl group is linked to the nucleus of a carbon compound through a carbon atom. It is not limited to the production of hydrocarbon sulphonyl derivatives, but includes the production of substituted hydrocarbon sulphonyl compounds, such as oxygenated derivatives, nitro derivatives, halogen derivatives, etc.

Methods heretofore proposed for the production of alkyl or aralkyl sulphonic acids have involved either the reaction of a sulphite, such as sodium or ammonium sulphite, with an alkyl or aralkyl halide, or have involved the oxidation of a mercaptan or a metal salt of a mercaptan by a strong oxidizing agent. Both of these methods of production have serious objections, and involve numerous difficulties.

Alkyl and aralkyl sulphonyl chlorides have heretofore been produced by the action of phosphorus pentachloride on the corresponding sulphonic acid. The use of phosphorus pentachloride in any commercial operation is, of course, highly objectionable, and the preparation of sulphonyl chlorides by this method is also expensive, as it involves the production of the sulphonic acid first. Furthermore, it is known that some alkyl and aralkyl sulphonyl chlorides undergo partial decomposition or dissociation in the presence of phosphorus pentachloride, giving sulphur dioxide and the corresponding alkyl and aralkyl chloride.

In my copending applications, Serial Nos. 72,-983, filed April 6, 1936, now Patent No. 2,146,744; 136,129, filed April 10, 1937, now Patent No. 2,147,346, and 163,184, filed September 10, 1937, I have described and claimed a new process for the production of sulphonyl halides, sulphonic acids, sulphonamids and other sulphonyl derivatives by the treatment of a pseudothiourea derivative of a carbon compound, in which the nucleus of the carbon compound is linked through a carbon atom to the pseudothiourea residue, with a halogen in the presence of water, with oxidation of the sulphur atom and splitting of the bond between the sulphur atom and the carbon atom of the pseudothiourea residue and resulting formation of the sulphonyl halide corresponding to the halogen used. In this process, no intermediate formation of a mercaptan or other undesired product occurs, the sulphonyl halide being produced directly.

The present invention provides an improved process for the production of sulphonyl halides and their derivatives which has certain advantages over the process described in said copending applications, in that it does not involve the use of the relatively expensive thiourea, but involves the use of compounds which are more simply prepared than the pseudothiourea derivatives and which are produced from materials which do not have the corrosive characteristics of thiourea and its salts.

In accordance with the present invention, an organic thiocyanate in aqueous solution or suspension is treated with a halogen, as shown in the following equation:

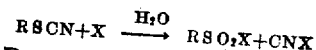

in which R represents an alkyl, aralkyl, aryl, alicyclic or heterocyclic residue linked through a carbon atom to the sulphur of the thiocyanate residue and X represents a halogen. The reaction is general, and is applicable to compounds having the thiocyanate group linked to the residue of a carbon compound through a carbon atom, whether the residue be a hydrocarbon residue, or a substituted hydrocarbon residue, including oxygenated compounds, nitro compounds, halogen derivatives, etc. The reactions apparently involves the oxidation of the sulphur atom followed by a splitting of the bond between the sulphur and the carbon of the thiocyanate residue, with the direct formation of the sulphonyl halide.

From the sulphonyl halide derivatives so prepared, the corresponding sulphonic acids may be readily prepared by hydrolysis, as by warming in water, and their metallic salts by reaction with a base in aqueous solution, e. g. with sodium or potassium hydroxide, or other base. The corresponding sulphonamids are readily prepared by reacting the sulphonyl halides directly with ammonia, or amines.

The thiocyanates used for the production of the sulphonyl compounds are readily prepared by known methods, as by the reaction of organic salts, such as organic sulphates or halides with sodium thiocyanate, or ammonium thiocyanate, or by other known methods. To convert the organic thiocyanates to the corresponding sulphonyl halides, the thiocyanate is simply suspended or dissolved in water, and subjected to the action of a halogen, as by stirring the solution or suspension in an atmosphere of gaseous chlorine or bromine, by bubbling chlorine or bromine through the solution or suspension, or by otherwise bringing a halogen into contact with the aqueous suspension or solution, as by dripping bromine into the solution or suspension. If the thiocyanate is insoluble in water, or relatively insoluble in water, a small quantity of an emulsifying or dispersing agent may be added to promote the dispersion of the thiocyanate, but the use of such dispersing agent is, of course, unnecessary. Also, if desired, an inert organic solvent for the thiocyanate may be added.

In general, the temperature of the reaction mixture should be kept relatively low, advantageously between about 0° and 30° C. Best results are usually obtained between 0° C. and 15° C.

The reaction, with most organic thiocyanates, proceeds rapidly and smoothly. The yields are generally excellent, and in many cases quantitative. The alkyl, aralkyl and alicyclic thiocyanates react more readily and rapidly than do the aryl thiocyanates, such as the phenyl thiocyanates. With the alkyl, aralkyl and alicyclic thiocyanates, the reaction is generally completed in a few hours, whereas it may take a considerably longer period of time to complete the reaction with aryl thiocyanates, such as the phenyl thiocyanates. In the reaction, the sulphonyl halide corresponding to the halogen used for effecting the reaction is formed directly, and generally separates in an oily layer. The sulphonyl halides may be purified by dissolving in ether or other organic solvents, with drying in the usual manner over anhydrous sodium sulphate or other water absorbing agents, or in other ways. Some of the lower alkyl sulphonyl halides, such as methyl, ethyl, propyl or butyl sulphonyl chloride, may be distilled without decomposition, using a reduced pressure. The higher alkyl sulphonyl chlorides, the alicyclic or unsaturated alkyl sulphonyl chlorides, and the sulphonyl bromides are advantageously purified by conversion to the corresponding sulphonyl fluorides, as by boiling with concentrated aqueous potassium fluoride solution. The sulphonyl fluorides so obtained are unusually stable and in most cases can be vacuum distilled or crystallized from appropriate solvents for purification. Similarly, the sulphonyl halides are readily converted into the corresponding sulphonamids, as by treatment with ammonia or amines, such as ethyl amine, aniline, etc. In general, these sulphonamids are stable, crystalline compounds which are readily purified by the usual methods of recrystallization from solvents.

The invention will be further illustrated by the following examples, although it is not limited thereto (parts by weight):

Example 1.—12.46 parts of methyl thiocyanate and 100 parts of water are mixed in a vessel surrounded by an ice-water bath. The mixture is agitated vigorously while chlorine gas is passed into the mixture at a rate such that the temperature is maintained at 5° C. or lower. The passage of the chlorine is continued until the yellow color of the reaction mixture shows that an excess of chlorine is present. This takes about one to two hours. The oil which separates is extracted with ether, and the resulting ether solution is washed first with sodium bisulphite solution and then with sodium bicarbonate solution, after which it is dried over anhydrous calcium chloride. The methyl sulphonyl chloride is distilled at reduced pressure. It boils at 55° C./11 mm. It is readily converted to the corresponding sulphonic acid by aqueous hydrolysis, and to the corresponding methyl sulphonamid by treatment with ammonia.

Example 2.—20 parts of ethyl thiocyanate suspended in 200 parts of water are agitated vigorously and kept at 0° to 5° C. while chlorine gas is introduced at the rate of 2 to 3 liters per hour. The introduction of the chlorine gas is continued until the reaction mixture has a permanent yellow color, indicating an excess of chlorine. The excess chlorine is removed by blowing air through the reaction mixture. The mixture is then extracted with ether and the ether solution is washed with sodium bicarbonate and sodium thiosulphate solution, after which it is dried over anhydrous calcium chloride and distilled. Ethyl sulphonyl chloride, boiling at 71–72° C./20 mm. is obtained.

Example 3.—7.95 parts of n-propyl thiocyanate and 100 parts of water are placed in a cooled vessel and vigorously agitated while gaseous chlorine is introduced, the temperature of the mixture being kept between 2 and 9° C. After completion of the reaction, the n-propyl sulphonyl chloride is separated and purified as in Example 1. It boils at 69° C./11 mm.

Example 4.—10 parts of freshly crystallized, finely pulverized benzyl thiocyanate are suspended in 200 parts of water and the suspension is agitated vigorously while passing chlorine gas into the mixture. The temperature is maintained at 0° to 2° C. by means of a cooling mixture around the reaction vessel. When the formation of chlorine hydrate in the reaction vessel indicates the presence of an excess of chlorine, the cooling bath is removed and the temperature of the reaction mixture is allowed to rise slowly to room temperature while the introduction of the chlorine gas is continued. The benzyl sulphonyl chloride obtained may be filtered out of the reaction mixture as a slightly impure waxy solid melting at 84–88° C.

Example 5.—5 parts of freshly crystallized, finely pulverized p-nitro benzyl thiocyanate are ground into a thin paste with 100 parts of water. Chlorine gas is passed into the resulting suspension with vigorous stirring while maintaining the temperature at 4 to 5° C. for thirty minutes, after which the temperature of the reaction mixture is raised to room temperature and the introduction of chlorine is continued for four hours. The crude p-nitro benzyl sulphonyl chloride is separated. After washing with ether and recrystallizing from benzene, a product melting at 91–92° C. is obtained.

Example 6.—10 parts of phenyl thiocyanate are suspended in 100 parts of water, and chlorine is introduced into the resulting mixture for eight hours. An oil separates which may be distilled. Analysis of the distillate shows that the product contains less than half of the amount of combined chlorine required for phenyl sulphonyl chloride, indicating that the reaction is incomplete. Chlorination under the same conditions for sixty hours yields a product which still contains some unchanged starting material. Nevertheless, the product obtained after eight hours of chlorination, as well as that after sixty hours of chlorination, contains phenyl sulphonyl chloride, as shown by the fact that the crude oily product forms phenyl sulphonyl anilide with aniline. As pointed out above, the aryl thiocyanates do not react as readily with the halogen to form the corresponding sulphonyl halides as do the alkyl, alicyclic and aralkyl thiocyanates.

*Example 7.*—115 parts of n-butyl thiocyanate are stirred violently in 1500 parts of water in an atmosphere of chlorine. The reaction mixture is maintained at a temperature of about 10 to 20° C. After about five hours, the absorption of chlorine ceases, and the oil layer, containing crude n-butyl sulphonyl chloride, is separated from the aqueous layer, washed with water and distilled under a vacuum. The redistilled n-butyl sulphonyl chloride boils at about 90° C./14 mm.

*Example 8.*—75 parts of 2-thiocyano-octane are violently agitated with 300 parts of water in an atmosphere of gaseous chlorine. The temperature of the reaction mixture is maintained at about 10 to about 20° C. by external cooling. The crude sulphonyl chloride formed separates as a heavy oil. It is washed with water and sodium bisulphite solution, and is then converted to octane-2-sulphonyl fluoride by boiling with an excess of aqueous potassium fluoride. The resulting fluoride is a colorless oil boiling at about 88° C./3 mm.

*Example 9.*—40 parts of cyclopentyl thiocyanate are dispersed in 500 parts of water and the dispersion is violently agitated in an atmosphere of gaseous chlorine until the absorption of chlorine ceases. This requires about five hours. The resulting cyclopentyl sulphonyl chloride separates as a heavy oil which is converted to the corresponding fluoride as in the preceding example. The fluoride is a colorless liquid boiling at about 60° C./3 mm.

*Example 10.*—40 parts of cetyl thiocyanate are suspended in 700 parts of water and subjected to the action of chlorine at a temperature of 15 to 20° C. as in the preceding example. The cetyl sulphonyl chloride separates as a white greasy solid. It is cooled and separated by suction filtration as a white, waxy mass. This is purified by washing with water and sodium bisulphite. On boiling with aqueous potassium hydroxide, it forms cetyl potassium sulphonate.

*Example 11.*—72 parts of crystalline 1,2-dithiocyano-ethane are suspended in 300 parts of water and subjected to the action of chlorine as in the preceding example while the temperature is maintained at 15 to 20° C. Ethane-1,2-disulphonyl chloride separates as a greasy white solid which may be separated by filtration from the solution.

*Example 12.*—50 parts of p-ter-octyl phenoxyethyl thiocyanate are suspended in 300 parts of water and subjected to the action of chlorine as in the preceding example for three hours at 15° C. p-ter-octyl phenoxyethyl sulphonyl chloride separates as a thick oil which on boiling with excess caustic soda solution dissolves with the formation of p-ter-octyl phenoxyethyl sodium sulphonate, which yields a soapy aqueous solution.

*Example 13.*—35 parts of cyclohexyl thiocyanate, suspended in 300 parts of water, are subjected to the action of chlorine as in the preceding example while maintaining the temperature at 10 to 15° C. Cyclohexyl sulphonyl chloride separates as a heavy oil which may be converted to cyclohexyl sulphonyl fluoride by boiling with aqueous potassium fluoride. The cyclohexyl sulphonyl fluoride boils at 90 to 97° C./3 mm.

*Example 14.*—100 parts of n-butoxyethoxyethyl thiocyanate are agitated with 750 parts of water. 240 parts of bromine are added dropwise to the mixture while maintaining the temperature at 10° C. The reaction mixture is agitated for about five hours at about 5 to 10° C. after all of the bromine is added. The reaction mixture is then washed with cold water and cold sodium bisulphite solution while maintaining the temperature below about 10° C. n-butoxyethoxyethyl sulphonyl bromide forms as a heavy oil, which is converted to the more stable fluoride by aqueous potassium fluoride. The fluoride is a colorless, almost odorless oil, boiling at 110–120° C./3 mm.

*Example 15.*—Tetrahydrofurfuryl thiocyanate is converted to tetrahydrofurfuryl sulphonyl chloride as in Example 13. The sulphonyl chloride has a boiling point of about 115–116° C. at 5 mm. pressure.

It will be understood that in the preceding examples, the reaction has been descibed as applied to a number of typical organic thiocyanates, with the production of the corresponding sulphonyl halides. These sulphonyl halides are readily converted to the sulphonic acids by aqueous hydrolysis, as by boiling with water or dilute acid, to the corresponding salts either by neutralization of the sulphonic acids or by boiling the halides with caustic solution, to corresponding sulphonamids by treatment with ammonia or amines, etc. These latter reactions have not been described in detail, as they are well known to chemists.

The new reaction of the present application is a general reaction, applicable to organic thiocyanates generally, whether the carbon compound nucleus linked to the sulphur of the thiocyanate group is substituted or unsubstituted, and whether it is alkyl, aralkyl, aryl, alicyclic or heterocyclic in nature. Among the alkyl sulphonyl halides which may be readily produced by this method are the lower alkyl compounds, such as the methyl, ethyl, the isomeric propyls, butyis, amyls, hexyls, heptyls, etc., as well as the higher alkyl sulphonyl halides, such as the cetyl, oleyl, stearyl, etc. Also, the various aralkyl sulphonyl halides are readily prepared, as well as the aryl, the alicyclic, and the heterocyclic sulphonyl halides. Among the sulphonyl halides which are readily prepared by the process of the present application are those corresponding to the following thiocyanates: methyl, ethyl, propyl, butyl, amyl, hexyl, heptyl, octyl, nonyl, cetyl, oleyl, stearyl, palmityl, lauryl, benzyl, phenylethyl, nitrobenzyl, phenyl, tolyl, cyclopentyl, cyclohexyl, cyclopropyl, naphthyl, propylnaphthyl, tetrahydrofurfuiyl, B-acetoxyethyl, allyl, crotyl, citronnelyl, nitrotolyl, B-B'-dithiocyano-alkoxy ethers, thiocyanoethyl ether, B-B'-dithiocyano-alkyl ethers, diphenyl, diphenyl oxide, aminophenyl, aminotolyl, and others. These thiocyanates, and many others which may be used for the production of sulphonyl halides in accordance with the present invention, are more or less readily prepared by known processes. The preparation of the thiocyanates is not a part of this invention.

It will be understood that the sulphonyl halides prepared as described may be converted into sulphonic acids, salts of sulphonic acids, sulphonamids, etc., by known reactions, either after purification, simple separation from the reaction mixture without purification, or by the treatment of the crude reaction products. In such cases, the crude sulphonyl derivative produced by reaction of an organic thiocyanate with a halogen is somewhat unstable, and cannot be conveniently purified. In such cases it is frequently advantageous, if purification is desired, to convert the product to a more stable or more easily purified product, for purification or use. For example, some of the sulphonyl bromides are quite unstable, and it is frequently advantageous to convert them to the more stable and more easily purified sulphonyl fluorides or sulphonamids.

I claim:

1. The process of sulphonyl halides which comprises subjecting an organic thiocyanate in which the nucleus of a carbon compound is linked through a carbon atom to the sulphur of the thiocyanate radical to the action of a halogen in the presence of water.

2. The process of producing sulphonyl halides which comprises subjecting an organic thiocyanate having an organic radical linked through a carbon atom to the sulphur of the thiocyanate radical to the action of a halogen in the presence of water.

3. The process of producing alkyl sulphonyl halides which comprises reacting an alkyl thiocyanate with a halogen in the presence of water.

4. The process of producing aralkyl sulphonyl halides which comprises reacting an aralkyl thiocyanate with a halogen in the presence of water.

5. The process of producing aryl sulphonyl halides which comprises reacting an aryl thiocyanate with a halogen in the presence of water.

6. The process of producing sulphonyl halides which comprises reacting a compound of the formula RSCN, in which R is the nucleus of an organic compound linked through a carbon atom to the sulphur atom, with a halogen in the presence of water.

7. The process of preparing sulphonyl halides which comprises reacting an organic thiocyanate with a halogen in the presence of water while maintaining the temperature below about 30° C.

8. The process of preparing sulphonyl halides which comprises reacting an organic thiocyanate with a halogen in the presence of water while maintaining the temperature between about 5° C. and about 15° C.

9. The process as in claim 1, in which the halogen used is chlorine.

TREAT B. JOHNSON.

CERTIFICATE OF CORRECTION.

Patent No. 2,174,856.                                    October 3, 1939.

TREAT B. JOHNSON.

It is hereby certified that error appears in the printed specification of the above numbered patent requiring correction as follows: Page 1, second column, line 35, for "reactions" read reaction; page 2, second column, line 33, Example 3, for "11 mm." read 10 mm.; page 3, second column, line 73, for "such" read some; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.

somewhat unstable, and cannot be conveniently purified. In such cases it is frequently advantageous, if purification is desired, to convert the product to a more stable or more easily purified product, for purification or use. For example, some of the sulphonyl bromides are quite unstable, and it is frequently advantageous to convert them to the more stable and more easily purified sulphonyl fluorides or sulphonamids.

I claim:

1. The process of sulphonyl halides which comprises subjecting an organic thiocyanate in which the nucleus of a carbon compound is linked through a carbon atom to the sulphur of the thiocyanate radical to the action of a halogen in the presence of water.

2. The process of producing sulphonyl halides which comprises subjecting an organic thiocyanate having an organic radical linked through a carbon atom to the sulphur of the thiocyanate radical to the action of a halogen in the presence of water.

3. The process of producing alkyl sulphonyl halides which comprises reacting an alkyl thiocyanate with a halogen in the presence of water.

4. The process of producing aralkyl sulphonyl halides which comprises reacting an aralkyl thiocyanate with a halogen in the presence of water.

5. The process of producing aryl sulphonyl halides which comprises reacting an aryl thiocyanate with a halogen in the presence of water.

6. The process of producing sulphonyl halides which comprises reacting a compound of the formula RSCN, in which R is the nucleus of an organic compound linked through a carbon atom to the sulphur atom, with a halogen in the presence of water.

7. The process of preparing sulphonyl halides which comprises reacting an organic thiocyanate with a halogen in the presence of water while maintaining the temperature below about 30° C.

8. The process of preparing sulphonyl halides which comprises reacting an organic thiocyanate with a halogen in the presence of water while maintaining the temperature between about 5° C. and about 15° C.

9. The process as in claim 1, in which the halogen used is chlorine.

TREAT B. JOHNSON.

CERTIFICATE OF CORRECTION.

Patent No. 2,174,856.  October 3, 1939.

TREAT B. JOHNSON.

It is hereby certified that error appears in the printed specification of the above numbered patent requiring correction as follows: Page 1, second column, line 35, for "reactions" read reaction; page 2, second column, line 33, Example 3, for "11 mm." read 10 mm.; page 3, second column, line 73, for "such" read some; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.